US 8,739,908 B2
(12) United States Patent
Taniguchi et al.

(10) Patent No.: US 8,739,908 B2
(45) Date of Patent: Jun. 3, 2014

(54) MOTOR DRIVEN VEHICLE

(75) Inventors: Yoichi Taniguchi, Wako (JP); Atsushi Yonehana, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 13/326,610

(22) Filed: Dec. 15, 2011

(65) Prior Publication Data

US 2012/0160579 A1    Jun. 28, 2012

(30) Foreign Application Priority Data

Dec. 22, 2010    (JP) .................................. 2010-286203

(51) Int. Cl.
*B62M 7/12* (2006.01)
*B60R 16/04* (2006.01)

(52) U.S. Cl.
CPC . *B60R 16/04* (2013.01); *B62M 7/12* (2013.01)
USPC .......................................... 180/68.5; 180/220

(58) Field of Classification Search
CPC ................................ B62M 7/12; B60R 16/04
USPC .............. 180/218, 219, 220, 216, 65.1, 68.5; 301/6.5
See application file for complete search history.

(56) References Cited

U.S. PATENT DOCUMENTS

| | | | | |
|---|---|---|---|---|
| 4,460,057 A | * | 7/1984 | Kohyama | 180/210 |
| 6,047,786 A | * | 4/2000 | Stevenson et al. | 180/65.1 |
| 7,210,550 B2 | * | 5/2007 | Yonehana et al. | 180/220 |
| 7,484,582 B2 | * | 2/2009 | Iwashita et al. | 180/65.1 |
| 7,931,110 B2 | * | 4/2011 | Nishiura et al. | 180/220 |
| 8,360,188 B2 | * | 1/2013 | Yonehana et al. | 180/220 |
| 2004/0079574 A1 | * | 4/2004 | Ono et al. | 180/252 |
| 2012/0048630 A1 | * | 3/2012 | Nishiura et al. | 180/65.31 |
| 2012/0080254 A1 | * | 4/2012 | Tsukamoto et al. | 180/68.5 |

FOREIGN PATENT DOCUMENTS

| | | |
|---|---|---|
| JP | 6-64580 A | 3/1994 |
| JP | 2987466 B2 | 12/1999 |
| JP | 2001-122175 A | 5/2001 |
| JP | 3324192 | 7/2002 |
| JP | 2004-122981 A1 | 4/2004 |
| JP | 2004-352189 A1 | 12/2004 |
| JP | 2008-221976 A | 9/2008 |
| JP | 2010-83365 A | 4/2010 |

* cited by examiner

*Primary Examiner* — John Walters
*Assistant Examiner* — Brian Swenson
(74) *Attorney, Agent, or Firm* — Squire Sanders (US) LLP

(57) ABSTRACT

A motor driven vehicle can include a swing arm swingably mounted to a vehicle body of a motor driven vehicle, and housing an electric motor driving a drive wheel of the vehicle. A pipe-like duct can have one end side connected to a hole communicating with an inside space of the swing arm, and another end side extending toward a vehicle body side. A harness, configured to drive the electric motor, can be inserted through the duct.

20 Claims, 10 Drawing Sheets

FIG. 8
(a)
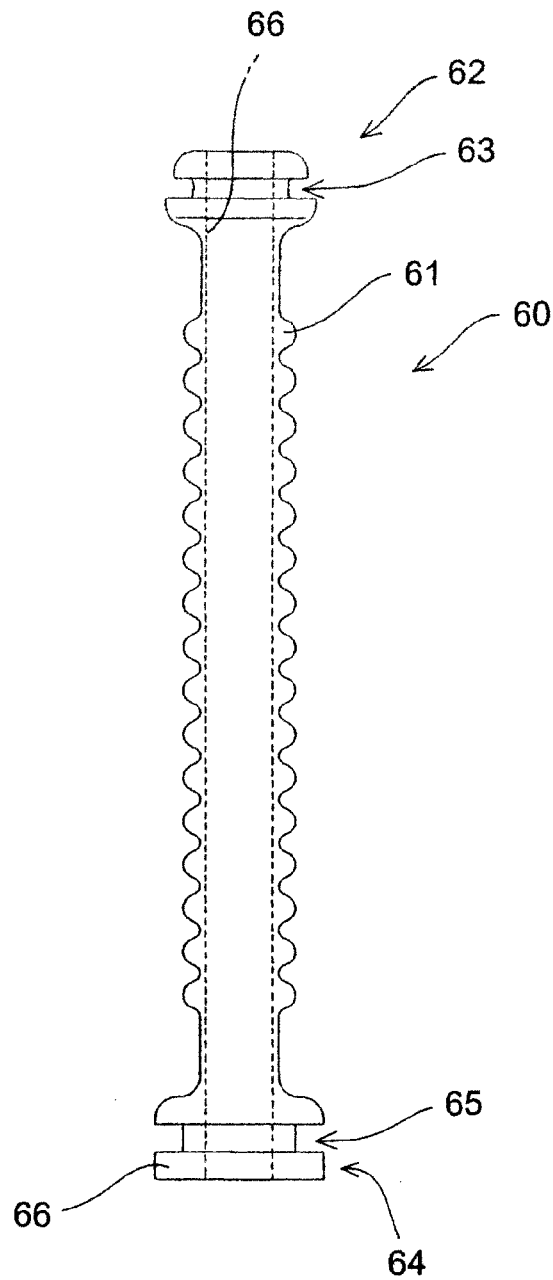
(b)
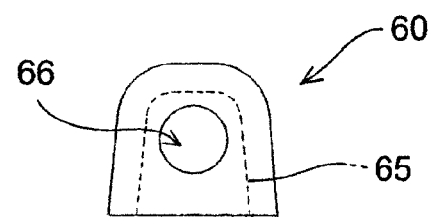

MOTOR DRIVEN VEHICLE

BACKGROUND

1. Field

The present invention relates generally to motor driven vehicles. In particular, the invention relates to a motor driven vehicle in which the electric power of an on-board battery is supplied to an electric motor, whose drive force rotates a drive wheel for travelling.

2. Description of the Related Art

There has heretofore been known a motor driven vehicle in which the electric power of an on-board battery is supplied to an electric motor, whose drive force rotates a drive wheel for travelling. In such a motor driven vehicle, the electric motor, the drive circuit of the electric motor, the on-board battery and the like produce heat during travelling. Therefore, it is considered to provide an effect of cooling them in configuring a vehicle body.

Patent Document 1 (Japanese Patent No. 3324192) discloses a scooter type straddle-ride motor driven two-wheeled vehicle configured as below. A swing arm is swingably mounted to a vehicle body to support a drive wheel. An electric motor is housed in a rear end portion of the swing arm. To cool the electric motor, a pipe-like cooling duct is connected to a front upper portion of the swing arm. The cooling duct has a body side end portion facing the front side of the vehicle and connected to a box incorporating a cooling fan below a storage space below a seat.

However, the technology of Patent Document 1 does not consider using the duct adapted to cool the electric motor, also for another function. In the motor driven vehicle described in Patent Document 1, an on-board battery is disposed in the lower portion of a foot-rest floor and the drive circuit of the electric motor, a charger and the like are arranged in the rear portion of the vehicle body. Therefore, it is necessary to install a cooling structure on the vehicle body side as well as on the duct mounted to the swing arm. Thus, there is a problem of increasing constituent parts and complicating the structure of the vehicle body.

SUMMARY

It is an object of the present invention to solve the problem of the conventional technology and to provide a motor driven vehicle that intends to minimize constituent parts and simplify a vehicle body structure by using a duct adapted to cool an electric motor to be housed in a swing arm, also for another function.

To achieve the above object, the present invention can be, in a first embodiment, a motor driven vehicle including a swing arm swingably mounted to a vehicle body of the motor driven vehicle and housing an electric motor driving a drive wheel of the motor driven vehicle. A pipe-like duct can have one end side connected to a hole communicating with an inside space of the swing arm, and the other end side extending toward the vehicle body side. A harness, used to drive the electric motor, is inserted through the duct.

In another embodiment, the electric motor can be disposed in the swing arm at a position close to the rear of the vehicle body. The swing arm can be swingably mounted to the vehicle body by a swing shaft provided on the swing arm at a position close to the front of the vehicle body. The duct can be attached on the one end side to an upper surface of the swing arm at a position close to the front of the vehicle body.

In another embodiment, a battery, adapted to supply electric power to the electric motor, can be housed in the swing arm. The harness can include a line connected to an external power source to charge at least the battery.

In another embodiment, the duct can be connected on the other end side to a vehicle body side connecting portion installed on the motor driven vehicle.

In another embodiment, the motor driven vehicle can be a scooter-type motor driven two-wheeled vehicle. The vehicle body side connecting portion can be a storage box installed below a seat of the motor driven vehicle.

In another embodiment, the battery adapted to supply electric power to the electric motor, and a control unit for the electric motor, are housed in the inside of the swing arm. The harness can be connected to the control unit at a position inside the swing arm.

In yet another embodiment, the swing arm includes a main body case composed of a wide case portion housing the battery, and a cantilever arm portion supporting the drive wheel. The control unit can be disposed to overlap the wide case portion and the cantilever arm portion as viewed from the side of the vehicle body and disposed close to the vehicle-body front side of the electric motor.

In another embodiment, a guide, engaged with a guide groove formed on the battery, is formed on a wall surface between housing spaces defined by a main body case housing the battery so as to extend along an insertion direction of the battery.

In yet another embodiment, the main body case housing the battery is configured to receive the battery inserted thereinto from any one of the left and right in the vehicle-width direction, and to be able to be divided into at least two parts in the vehicle-width direction.

As a result of certain configurations, the duct mounted to the swing arm can be used as a ventilation duct adapted to introduce outside air into the inside of the swing arm and also used as a protection member for the harness connected to the inside of the swing arm from the vehicle body side. Thus, it is not necessary to install a protection member for the harness independently of the cooling duct, thereby making it possible to reduce the number of parts and to simplify the structure of the vehicle body.

Also, as a result of certain embodiments, it is possible to reduce the deformation of the duct due to the swing movement of the swing arm, which can reduce an influence on the harness.

Furthermore, in certain embodiments, the charging line of the battery can be taken out from the vehicle body side such as, for example, a storage box below the seat of the motorcycle. Thus, convenience during charging work can be enhanced.

In embodiments where, the duct is connected on the other end side to the vehicle body side connecting portion provided on the motor driven vehicle, the duct can be supported stably.

In embodiments where, the motor driven vehicle is a scooter-type motor driven two-wheeled vehicle, and the vehicle body side connecting portion is the storage box installed below the seat of the motor driven vehicle, the duct has the other end side connected to the storage box. For example, the charging line can be taken out from the inside of the storage box, which facilitates work for connection with the external power source, thereby enhancing user's convenience. In addition, the charging line can be housed in the storage box.

In other embodiments, the battery adapted to supply electric power to the electric motor and the control unit for the electric motor are housed in the swing arm and the harness is connected to the control unit at a position inside the swing arm, The electric motor, the battery and the control unit which are heat-producing elements during travel can be housed in the swing arm. In addition, the duct capable of cooling the inside of the swing arm is provided. Thus, it is not necessary to install some cooling structure on the vehicle body side, which can avoid the complication of the vehicle body structure.

In other embodiments, mounting of the control unit to the main body case makes it possible to use the control unit as a reinforcing member enhancing the rigidity between the wide case portion and the arm portion. The line connecting the battery with the control unit and the line used to supply electric power from the control unit to the electric motor can be reduced in length.

Other configurations enable the battery to smoothly be inserted into the housing space and easily be positioned at a predetermined position. After being secured at the predetermined position, the battery can be prevented from being moved by vibrations or the like during travel, which can reduce an influence on the line connecting portion and the like.

In other embodiments, when the main body case is formed by aluminum casting or the like, it may have a size large in the direction of inserting the battery. In such a case, work for drawing a mold is difficult. However, since the wide case portion is formed so as to be able to be divided, it becomes easy to manufacture the main body case by casting.

BRIEF DESCRIPTION OF THE DRAWINGS

FIG. 8(*a*) is a front view of a duct and FIG. 8(*b*) is a bottom view of the duct.

DESCRIPTION OF PREFERRED EMBODIMENTS

Figure 1:
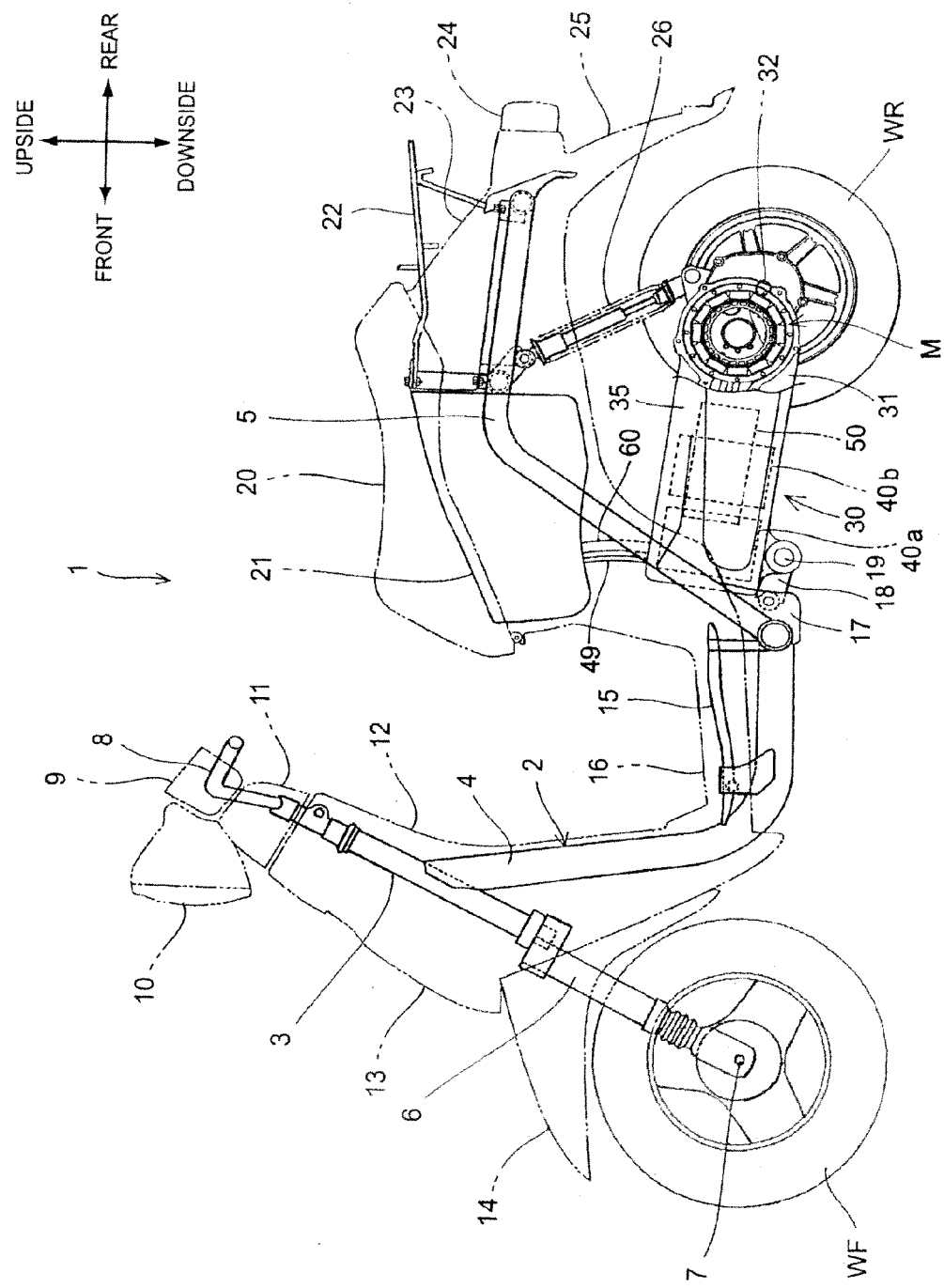
FIG. 1 is a lateral view of a motor driven vehicle according to an embodiment of the present invention.

Preferred embodiments of the present invention will hereinafter be described in detail with reference to the drawings. FIG. 1 is a lateral view of a motor driven vehicle 1 according to an embodiment of the present invention. The motor driven vehicle 1 can be, for example, a scooter-type straddle-ride two-wheeled vehicle having a low-floor 16. A rear wheel WR is driven by an electric motor M housed in a swing arm (a unit swing) 30. A head pipe 3 turnably supporting a stem shaft (not shown) is connected to a front portion of the body frame 2. A steering handlebar 8 covered by a handlebar cover 11 is connected to an upper portion of the stem shaft. A pair of left and right front forks 6 is connected to a lower portion of the stem shaft. The pair of left and right front forks 6 turnably supports the front wheel WF by an axle 7.

The body frame 2 includes a main pipe 4 extending downward from the rear portion of the head pipe 3 and a rear frame 5 joined to a rear end portion of the main pipe 4 and extending above the rear portion of the vehicle body. A floor frame 15 supporting the low-floor 16 is mounted to the main pipe 4 at a portion below the low-floor 16 and facing the back and forth direction of the vehicle body. A pair of left and right pivot plates 17 is attached to a joint portion between the main pipe 4 and the rear frame 5.

The swing arm 30 is of a cantilever type having an arm portion only on the vehicle-widthwise left side. The swing arm 30 is swingably supported by the body frame 2 via a swing shaft 19 passing through links 18 attached to the pivot plates 17. The swing arm 30 is a partially hollow structure made of metal such as aluminum or the like. The swing arm 30 is configured such that a swing arm cover 35 is attached to the vehicle-widthwise left side of a main body case 31. The electric motor M is housed inside the swing arm 30 at a position close to the axle 32. A board 50 serving as a control unit for the electric motor M is disposed on the vehicle-body front side of the electric motor M. Batteries 40*a*, 40*b* adapted to supply electric power to the electric motor M are disposed in the swing arm 30 at a position close to the front of the vehicle body and on the vehicle-widthwise right side of the board 50.

The rear wheel WR is rotatably supported by the swing arm 30 via the axle 32. The swing arm 30 is hung at the rear end portion by the rear frame 5 via a rear cushion 26. A storage box 21 serving as a luggage space is disposed under the seat 20 so as to be put between the pair of left and right rear frames 5.

The main pipe 4 of the body frame 2 is covered by a front cowl 13 on the front side of the vehicle body and by a leg shield 12 on the rear side of the vehicle body. A meter device 9 is disposed on the upper portion of the handlebar cover 11. A headlight 10 is attached to the vehicle-body front side of the meter device 9. A front fender 14 covering the front wheel WF is secured to the upper portion of the front forks 6.

The vehicle-widthwise outside of the rear frame 5 can be covered, in this embodiment, by the seat cowl 23. A taillight device 24 is attached to the rear end portion of the seat cowl 23. A rear carrier 22 joined to the rear frame 5 projects above the taillight device 24. A rear fender 25 covering the rear wheel WR from rear and above is provided below the taillight device 24.

A hollow pipe-like duct 60 can be attached to an upper surface of the swing arm 30 at a position close to the front of the vehicle body. The other end portion of the duct 60 can be joined to the bottom portion of the storage box 21 as a vehicle body side connection portion. A throttle cable 49 connected to a throttle opening sensor (see FIG. 3) projects from the inside of the swing arm 30. The throttle cable 49 can have an end portion extending along the body frame 2 toward the front of the vehicle body and connected to a throttle grip (not shown) attached to the steering handlebar 8.

Figure 2:
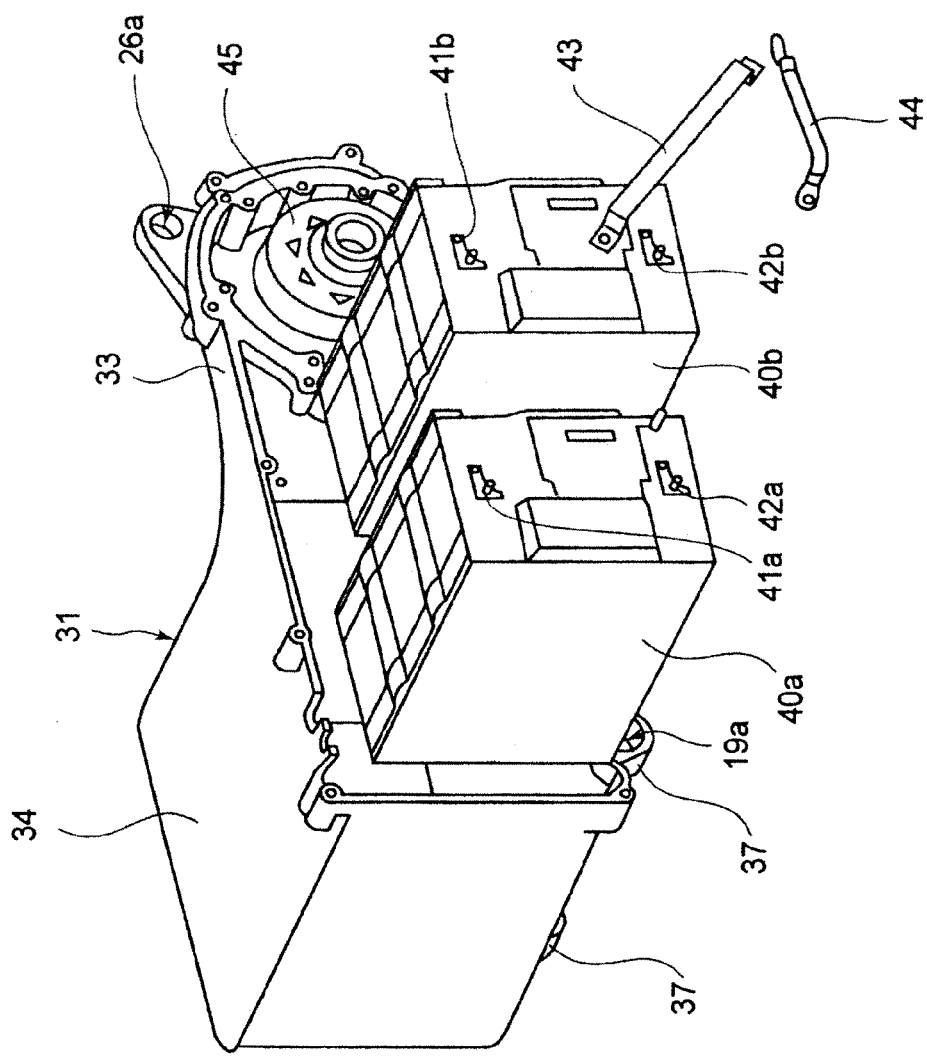
FIG. 2 is an exploded perspective view of a swing arm (when batteries are mounted).
Figure 3:
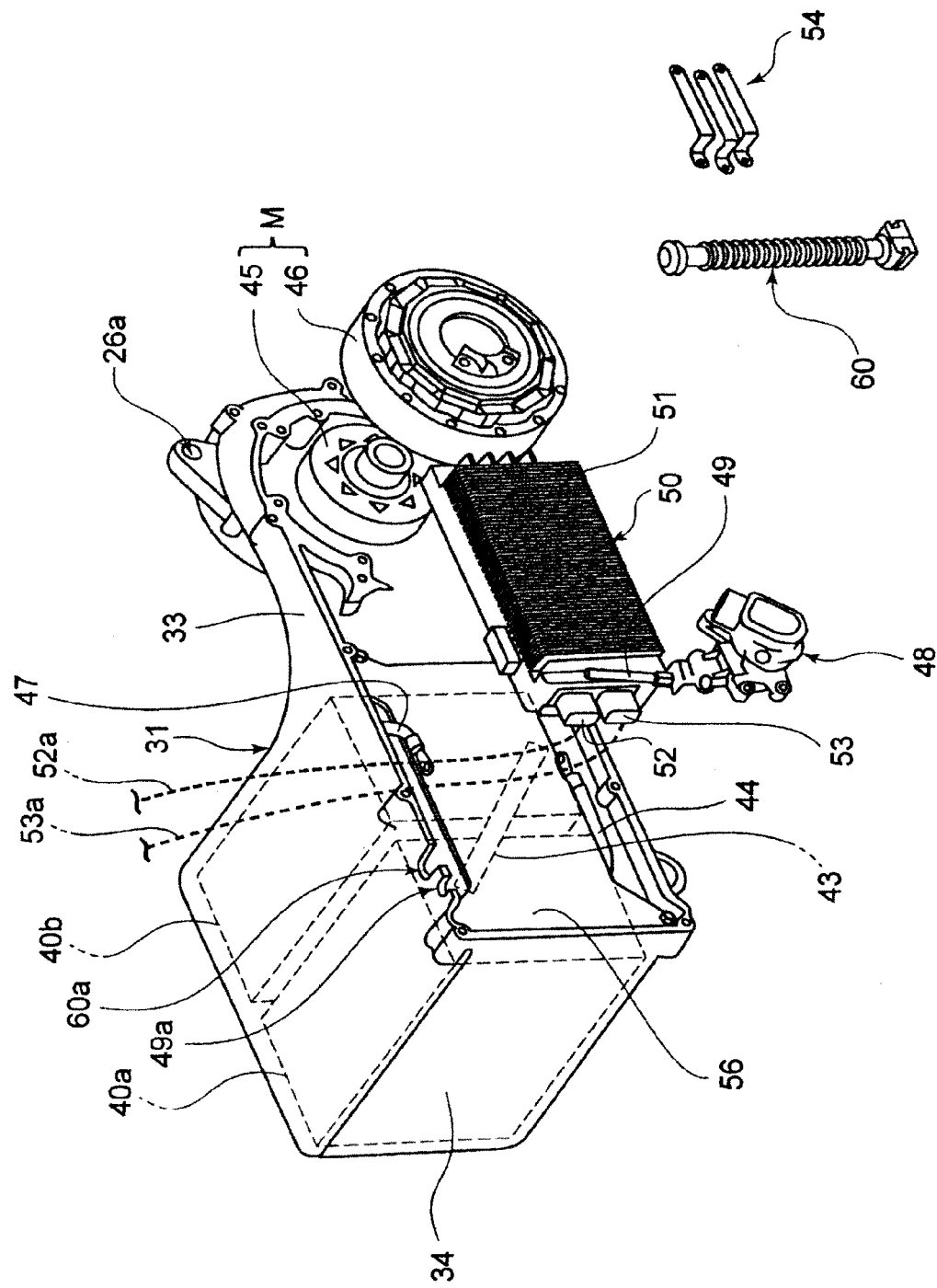
FIG. 3 is an exploded perspective view of the swing arm (when a board and an electric motor are mounted).
Figure 4:
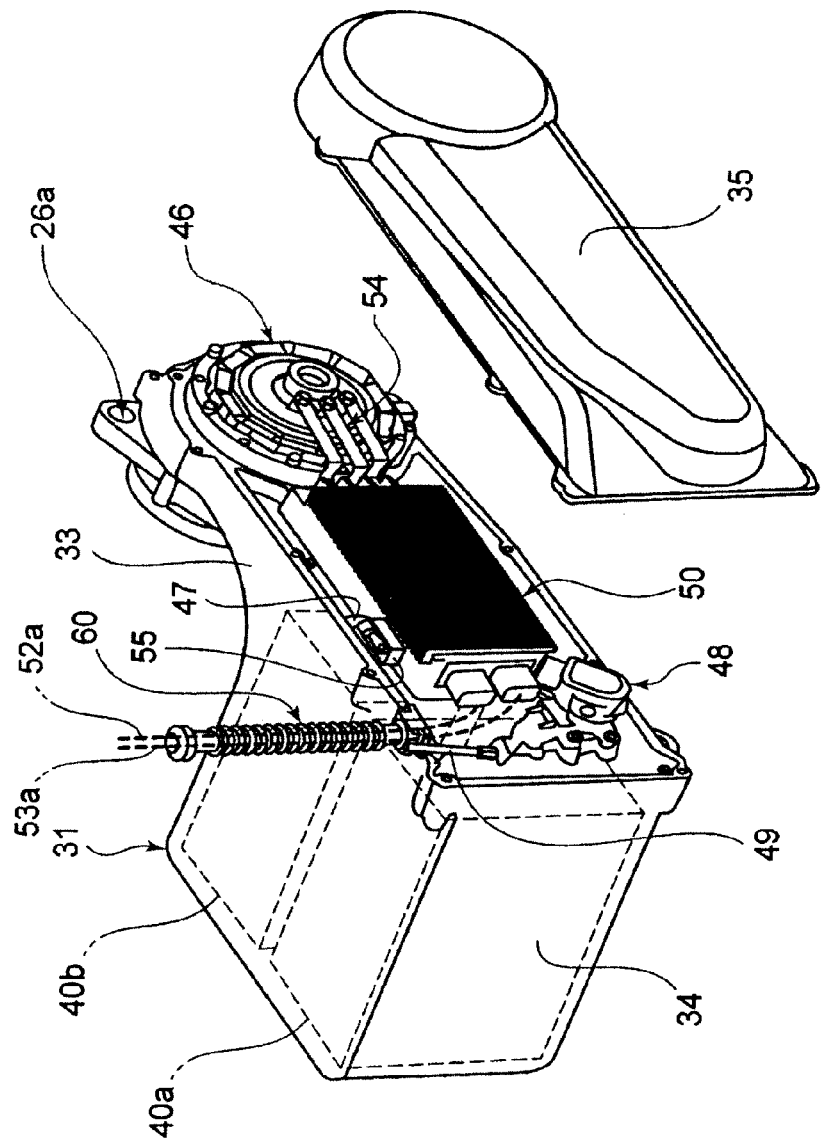
FIG. 4 is an exploded perspective view of the swing arm (when a swing arm cover is mounted).

FIGS. 2, 3 and 4 are exploded perspective views of the swing arm 30. FIG. 2 illustrates a state encountered when the batteries 40*a*, 40*b* are mounted to the swing arm 30. FIG. 3 illustrates a state encountered when the board 50 and the electric motor M are mounted to the swing arm 30. FIG. 4 illustrates a state encountered when the swing arm cover 35 is mounted to the swing arm 30.

As described above, the swing arm 30 is of a partially hollow structure made of metal such as aluminum or the like and of a cantilever type in which the rear wheel WR is supported by an arm portion 33 on the vehicle-widthwise left side. A pair of left and right pivot flanges 37 formed with respective through-holes 19a for the swing shaft 19 (see FIG. 1) is provided on the lower portion, on the vehicle-body front side, of the body case 31.

The batteries 40a, 40b having the same structure are each inserted from the vehicle-widthwise left side into the inside of a wide case portion 34 formed on the vehicle-body front side of the main body case 31. The batteries 40a, 40b, using, for example lithium-ion, can be of a module structure composed of a plurality of cells. In the present embodiment, one module is formed by rowing five cells in the vehicle-width direction.

The batteries 40a and 40b are provided with plus or positive terminals 41a and 41b, respectively, and with minus or negative terminals 42a and 42b, respectively, on a vehicle-widthwise left side lateral surface. A bus bar 43 as an electrical conductor connects the plus terminal 41a of the battery 40a with the minus terminal 42b of the battery 40b to connect in series both the batteries with each other. A minus side line 44 is connected on one end side with the minus terminal 42a of the battery 40a.

A rotor 45 of the electric motor M can be coupled to the axle 32 of the rear wheel WR via a speed-reduction mechanism (not shown). The main body case 31 can be formed at a rear end upper portion with an attachment hole 26a used to attach the rear cushion 26 (see FIG. 1).

Referring to FIG. 3, after the batteries 40a, 40b are housed at respective predetermined positions, a partition plate 56 can be mounted to the main body case 31 by means of a plurality of bolts or the like so as to be close to the lateral surfaces, on the vehicle-widthwise left side, of both the batteries. The partition plate 56 is made of an insulation material such as resin or the like. In addition, the partition plate 56 can be configured such that only the other end side of the minus side line 44 connected to the minus terminal 42a of the battery 40a and the other end side of the plus side line 47 connected to the plus terminal 41b of the battery 40b project from corresponding gaps formed in the upper and lower portions of the partition plate 56 toward the vehicle-widthwise left side.

A stator 46 of the electric motor M can be secured to the main body case 31 so as to cover a rotor 45 from the vehicle-widthwise left side. The board 50 is provided with a large number of cooling fins 51 on the vehicle-widthwise left side. In addition, the board 50 is provided with connectors 52, 53 at a vehicle-body front end portion. The connectors 52 and 53 are used to connect with harnesses 52a and 53a, respectively, extending around the vehicle body side.

The harnesses 52a, 53a, serving as electric wiring, can include not only a line used to charge the batteries 40a, 40b by an external power source (e.g. a 100 V commercial power source) but also lines used for a signal of a vehicle speed sensor for detecting the rotation speed of the front wheel WF, an operation signal of an ignition switch, etc.

A throttle opening sensor 48 driven by a throttle cable 49 is disposed on the vehicle-body front side of the board 50. The throttle opening sensor 48 is secured to the partition plate 56 by means of bolts or the like. The board 50 is secured by means of bolts or the like to the partition plate 56 on the vehicle-body front side and to the main body case 31 on the vehicle-body rear side. The vehicle-body rear side of the board 50 can extend to a position overlapping the arm portion as viewed from the side of the vehicle body. Therefore, the board 50 can be used as a rigid member for the main body case 31 by securing the board 50 with the bolts, which makes it possible to enhance the rigidity of the arm portion 33.

After mounting of the stator 46, the board 50 and the throttle opening sensor 48 is completed, a three-phase bus bar 54 used to supply electric power from the board 50 to the stator 46, and the hollow pipe-like duct are attached. Incidentally, the board 50 and the stator 46 are disposed close to each other, which makes it possible to reduce the overall length of the three-phase bus bar 54.

The duct 60 is attached to a duct notch 60a formed in an end face, on the vehicle-widthwise left side, of the wide case portion 34. The throttle cable 49 of the throttle opening sensor 48 is configured to be fitted in the cable notch 49a adjacent to the vehicle-body front side of the duct notch 60a.

Referring to the example shown in FIG. 4, the plus side line 47 connected to the plus terminal 41b of the battery 50 has the other end side connected to the board side plus terminal 55 formed on the upper surface of the board 50. A similar board side minus terminal (not shown) is provided on the lower surface of the board 50 and is connected to the minus side line 44.

The swing arm cover 35 is attached to seal the main body case 31 in order to prevent fluid, dust or the like from entering the main body case 31 from the outside. Because of this, the batteries 40a, 40b, the board 50 and the electric motor M can produce heat during the travel of the vehicle to increase the temperature in the internal space of the swing arm 30. However, the heat is released not only from the front surface of the main body case 31 by running air but also effectively toward the outside of the swing arm 30 via the duct 60. In the present embodiment, the harnesses 52a, 53a extending around the vehicle body side are passed through the duct 60. This makes it possible to use the duct 60 functioning as a cooling structure for a heat-producing member such as the electric motor M and the like also for a protection member for the harnesses 52a, 53a.

In the present embodiment, not only the electric motor M but also the batteries 40a, 40b and the board 50 are disposed inside the swing arm 30.

Therefore, it is not necessary to install a cooling structure other than the duct 60. This can simplify the vehicle body structure and reduce the number of component parts.

In the present embodiment, the upper end portion of the duct 60 is connected to the bottom portion of the housing box 21 (see FIG. 1). However, the upper end portion of the duct 60 can be connected to each of various connection portions on the vehicle body side. For example, a cooling box in which an electric fan is installed and the upper end portion of the duct 60 may be connected to the cooling box. The direction of the upper end opening portion of the duct 60 can be modified variously. For example, the upper end opening portion of the duct 60 may be directed toward the front side or rear side of the vehicle body.

Figure 5:
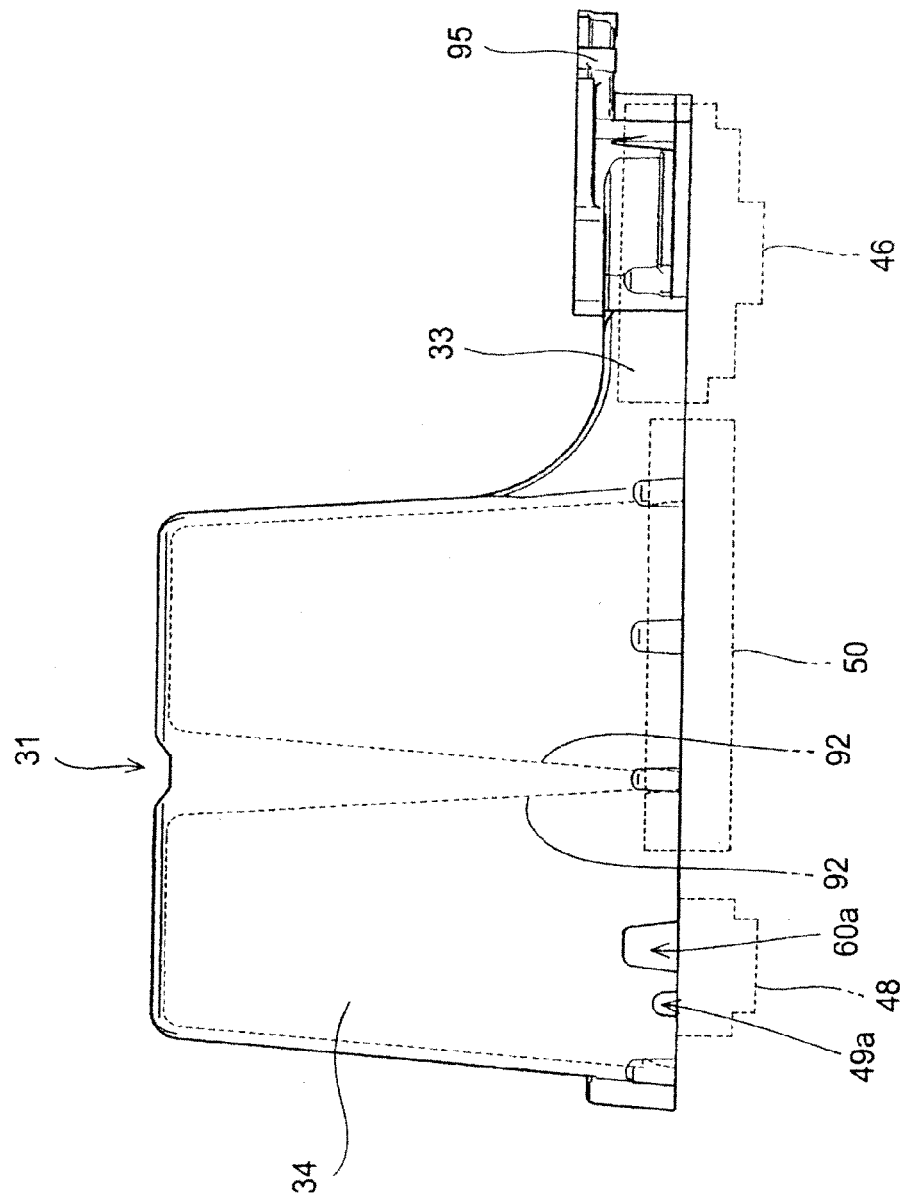
FIG. 5 is a cross-sectional plan view of a main body case of the swing arm.
Figure 6:
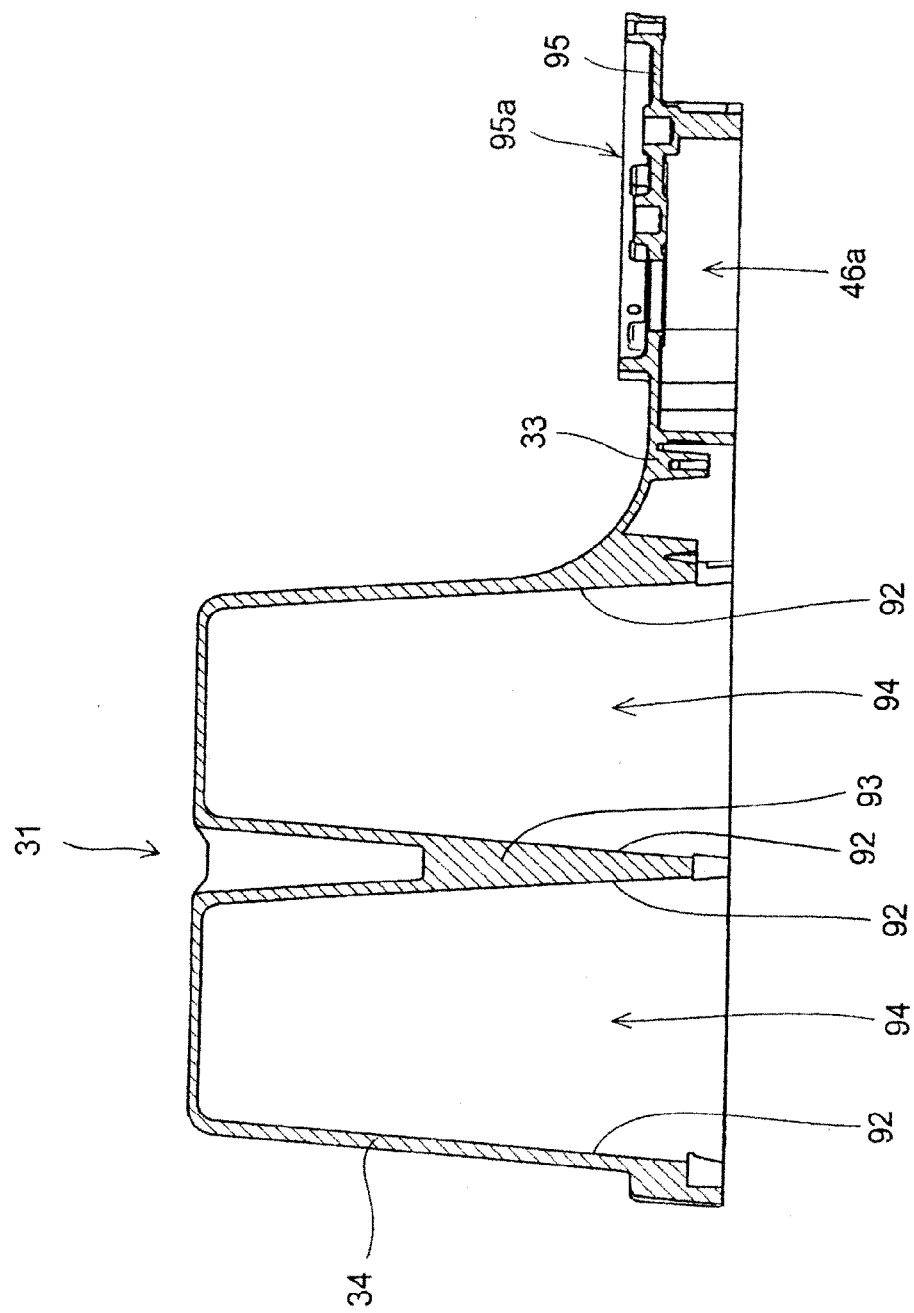
FIG. 6 is a cross-sectional plan view of the main body case of the swing arm.

FIG. 5 is a plan view of the main body case 31 of the swing arm 30. FIG. 6 is a cross-sectional plan view of the main body case 31. Respective housing spaces of the front and rear batteries 40a, 40b are partitioned by a partition wall 93. The wide case portion 34 is configured such that its vehicle-body anteroposterior end faces are slanted so as to gradually reduce an anteroposterior size as they go toward the vehicle-widthwise right side. In addition to this, also wall surfaces 92 defining the housing spaces 94 of the batteries 40a, 40b are slanted. With such a shape, when the main body case 31 is manufactured by aluminum casting or the like, the main body case 31 can easily be drawn from a mold.

The board 50 can be located on the vehicle-widthwise right side of the battery 40b on the vehicle-body rear side and is disposed to overlap a part of the vehicle-body front side battery 40a in the vehicle-width direction. The board 50 is disposed to project, for example, by the general half of its thickness from the main body case 31 toward vehicle-widthwise left side. The throttle opening sensor 48 and the stator 46 are disposed to project from the board 50 further toward the vehicle-widthwise left side. The rear end portion of the arm portion 33 can be provided with a reducer case 95 defining a housing space 95a for a reducer (not shown) and with a housing spacer 46a for the stator 46.

Figure 7:
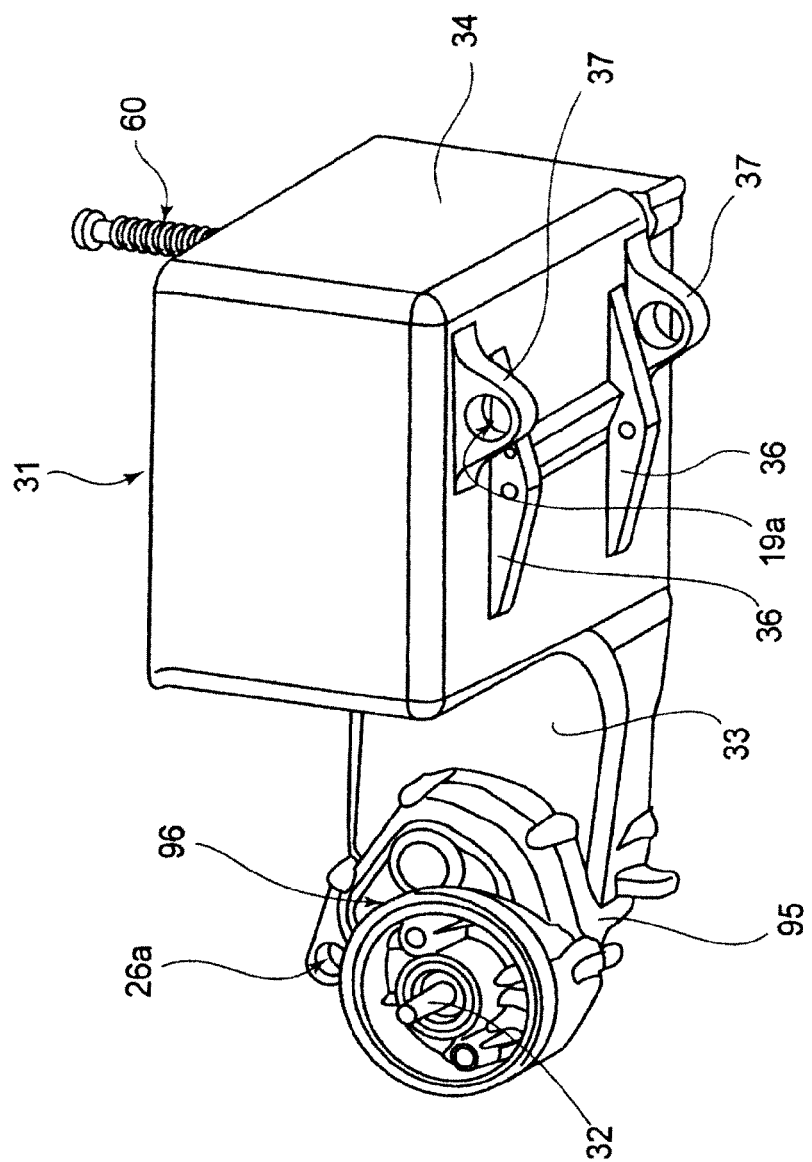
FIG. 7 is a perspective view of the swing arm as viewed from the vehicle-widthwise right side.

FIG. 7 is a perspective view of the swing arm 30 as viewed from the vehicle-widthwise right side. As described above, the pair of left and right pivot flanges 37 formed with the through-holes 19a for the swing shaft (see FIG. 1) is provided on the lower surface of the wide case portion 34. A pair of left and right under guards 36 can be provided on the inside of the pair of left and right pivot flanges 37. The under guards 36 are used to turnably attach a center stand not shown thereto and adapted to reduce an impact of external force against the lower surface of the wide case portion 34.

FIG. 7 illustrates a state where the reducer is housed in the reducer case 95 and a reducer case cover 96 is attached to the vehicle-widthwise right side of the reducer case 95. A wheel of the rear wheel WR is secured to the vehicle-widthwise left side of the reducer case cover 96 with a drum brake unit not shown between the wheel and the reducer case cover 96.

FIG. 8(a) is a front view of the duct 60 and FIG. 8(b) is a bottom view of the duct 60. The hollow pipe-like duct 60 is made of a flexible material such as resin, rubber or the like. The duct 60 is formed like a pipe having a through-hole 66 and formed with a large number of annular concave-convex shapes on the front surface side. The duct 60 is formed with a vehicle-body side attachment portion 62 on the upper side. The vehicle-body side attachment portion 62 is formed with an annular engaging groove 63 engaged with an attachment hole (not shown) formed in the bottom portion of the housing box 21. Incidentally, the shape of the duct can be changed variously. The pipe portion of the duct 60 can be formed like a bellows or formed with a level or smooth surface.

The duct 60 is formed with a swing arm side attachment portion 64 on the lower side. The swing arm side attachment portion 64 is formed with an engaging groove 65 engaged with the duct notch 60a formed in the main body case 31 of the swing arm 30. The engaging groove 65 is formed like a trapezoid conforming to the shape of the duct notch 60a. This prevents the duct 60 from turning and effectively prevents fluid or the like from entering the inside of the swing arm 30.

Figure 9:
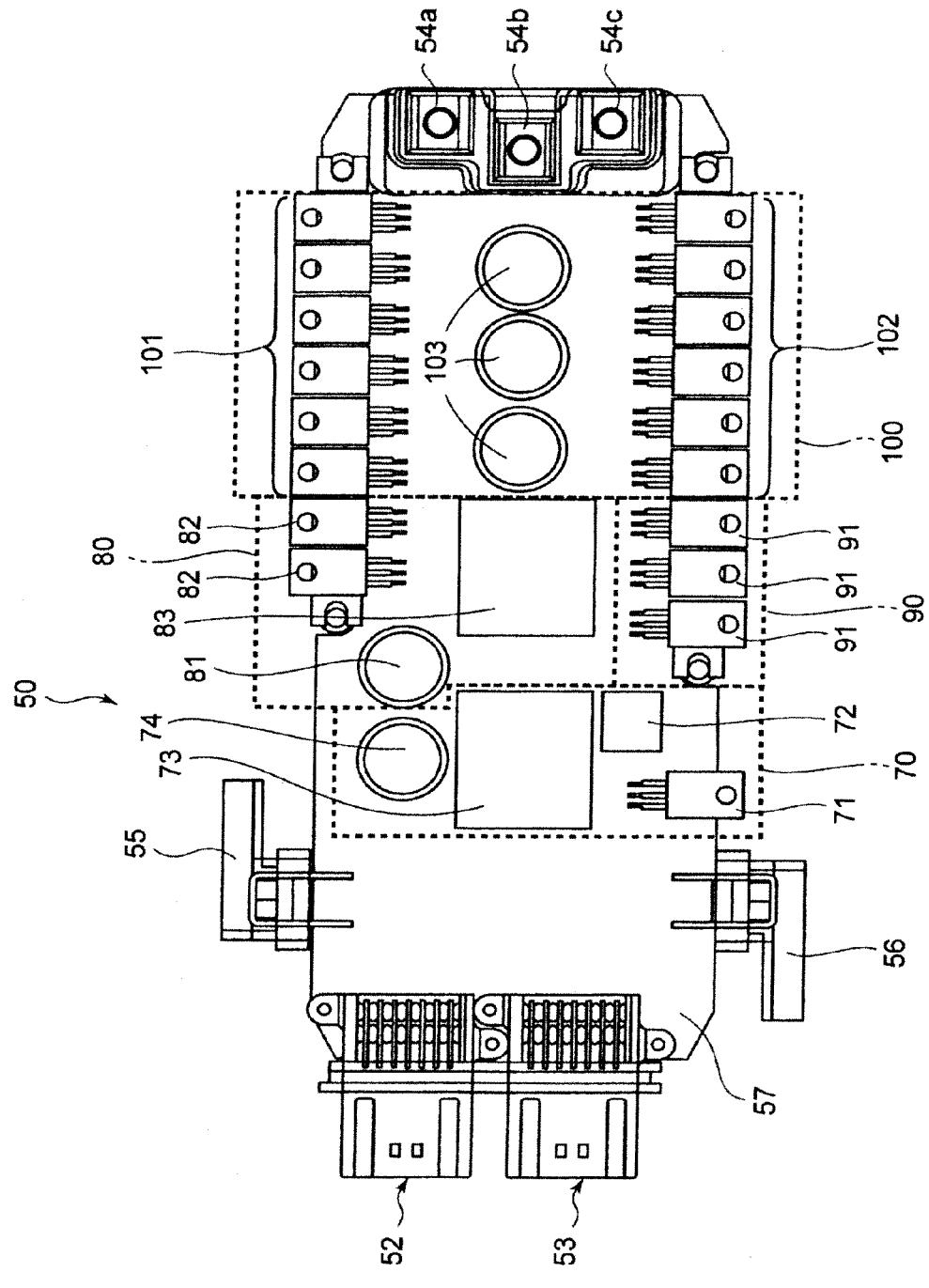
FIG. 9 is front view of a board as viewed from the vehicle-widthwise left side.

FIG. 9 is a front view of the board 50 as viewed from the vehicle-widthwise left side. The same reference numerals as those in the above denote like or corresponding portions. In addition, FIG. 9 illustrates an example of the board 50 with the cooling fins 51 removed. The board 50 is configured by mounting various electric devices on the front surface of a plate-like base 57. Four general groups of the electric devices, which can include a charger circuit 70, a down regulator circuit 80, a semiconductor type contactor 90 and a motor drive circuit 100 are mounted on the base 57.

The charger circuit 70 can be composed of an FET element 71, transformers 72, 73 and a capacitor 74 and disposed close to the front of the vehicle body. The down regulator circuit 80 can be composed of a capacitor 81, two FET elements 82 and a transformer 83. The semiconductor type contactor 90 is composed of three FET elements 91. The motor drive circuit 100 disposed close to the rear of the vehicle body is composed of six FET elements 101, three capacitors 103 and six FET elements 102.

The board side plus terminal 55 and the board side minus terminal 56 are attached to upper and lower portions, respectively, of the base 57 on the front side of the charger circuit 70. The connectors 52 and 53 for connection with the harnesses 52a and 53a, respectively, are attached to the front end portion of the base 57. A U-phase electrode 54a, a V-phase electrode 54b and a W-phase electrode 54c to which the respective three bus bars 54 are connected can be provided at the rear end portion of the base 57.

Figure 10:
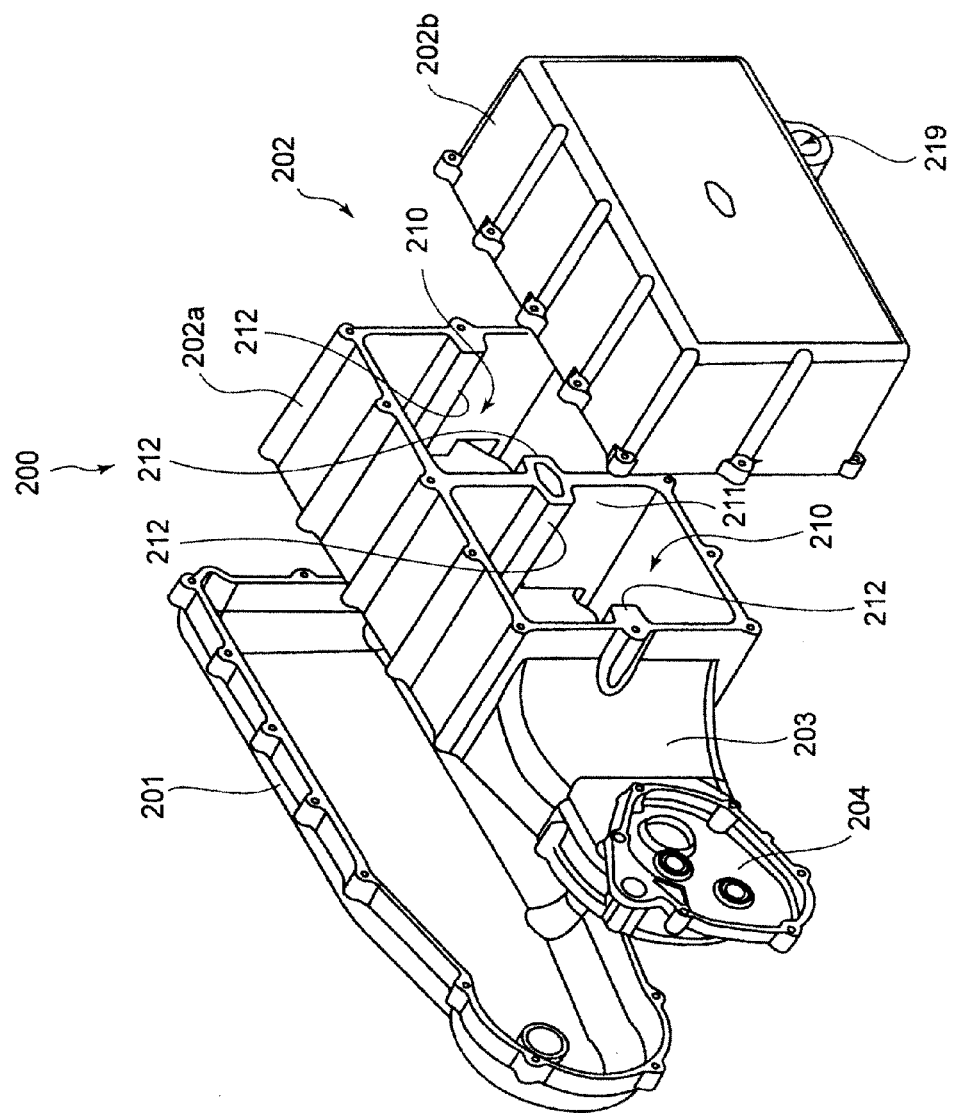
FIG. 10 is an exploded perspective view of the swing arm according to a modified example of the embodiment of the present invention.

FIG. 10 is an exploded perspective view of a swing arm 200 according to a modified example of the embodiment of the present invention. FIG. 10 illustrates the swing arm 200 as viewed from the right rear of the vehicle body. The present modified example is characterized in that a main body case 202 of the swing arm 200 has a left-right dual-partitioning structure. Specifically, the main body case 202 is composed by securing a right case 202b to a left case 202a by means of bolts or the like. The left case 202a is formed with a reducer case 204 and an arm portion 203 rotatably supporting the rear wheel WR. A swing arm cover 201 is mounted to the vehicle-widthwise left side of the left case 202a. The main body case 202 is formed with a through-hole 219 for the swing shaft 19 at its front lower portion.

The swing arm 200 according to the modified example has the main body case 202 dually partitioned in the vehicle-width direction. Therefore, also if the wide case portion housing the batteries is increased in vehicle-widthwise size, a mold can easily be drawn during casting work, which facilitates production work. When the wide case is dually partitioned, the casting work is facilitated. Therefore, it is possible to reduce the inclination angle of the wall surface 211 of the battery housing space 210. This can increase the volume of the housing space, which can allow for the enlargement of the battery.

The wall surface 211 of the housing space 210 of the swing arm 200 can be formed with vehicle-widthwise extending convex guides 212 at a generally middle height in the vertical direction of the vehicle body. On the other hand, a battery (not shown) can be formed with a guide groove not shown engaged with the guide 212. Therefore, the battery can smoothly be inserted into the housing space 210 and easily positioned at a predetermined position. In addition, a vibration proof function can be provided in which after being secured at the predetermined position, the battery can be prevented from being moved by vibrations or the like during travel. This guide structure can be applied to the batteries 40a, 40b and the main body case 31 illustrated in the embodiment described above.

As described above, the motor driven vehicle according to embodiments of the present invention, i.e., the motor driven motorcycle having the electric motor, the battery and the control unit housed inside the swing arm includes the duct adapted to allow the inside space of the swing arm to communicate with the main body side storage box and the harness necessary for connection with the external power source during the charging of the batteries. Therefore, the duct adaptable as the cooling structure for the swing arm can be used as the protection cover for the harnesses. This can reduce the number of component parts, and therefore can simplify the configuration of the motorcycle. The elements producing heat during travel are housed in the swing arm and the duct capable of cooling the inside of the swing arm is provided. Therefore, it is not necessary to install another cooling structure on the main body side, which can avoid the complication of the vehicle body structure.

The structure of the motor driven vehicle, the shape and structure of the swing arm, the shape and material of the duct, the shape and structure of the battery, the arrangement and connection position of the duct, etc. are not limited to the embodiment described above but can be modified in various ways. For example, the vehicle body side end portion of the duct may be connected to a cooling box or a cooling space separate from the storage box. The duct structure according to the present invention is not limited to the motor driven two-wheeled vehicle but can be applied to various vehicles such as straddle-ride type three- or four-wheeled vehicles or the like having the swing arm.

Description of Reference Symbols

1 . . . Motor driven vehicle, 2 . . . Body frame, 19 . . . Swing shaft, 21 . . . Storage box (Main body side connecting portion), 30, 200 . . . Swing arm, 31 . . . Main body case, 34 . . . Wide case portion, 35 . . . Swing arm cover, 40a, 40b . . . Battery, 48 . . . Throttle opening sensor, 49 . . . Throttle cable, 50 . . . Board (Control unit), 52, 53 . . . Connector, 52a, 53a . . . Harness, 60 . . . Duct, 60a . . . Duct notch, 49a . . . Cable notch, 212 . . . Guide, WR . . . Rear wheel (Drive wheel)

The invention claimed is:

1. A motor driven vehicle, comprising:
a swing arm swingably mounted to a vehicle body of the motor driven vehicle and housing an electric motor driving a drive wheel of the motor driven vehicle;
a pipe-like duct having one end side connected to a hole communicating with an inside space of the swing arm and another end side extending toward a vehicle body side; and
a battery configured to supply electric power to the electric motor, said battery being housed in the swing arm,
wherein a harness, configured to drive the electric motor, is inserted through the duct, and the harness includes a line connected to an external power source to charge at least the battery.

2. The motor driven vehicle according to claim 1,
wherein the electric motor is disposed in the swing arm at a position close to a rear of the vehicle body,
wherein the swing arm is swingably mounted to the vehicle body by a swing shaft provided on the swing arm at a position close to a front of the vehicle body, and wherein the duct is attached on the one end side to an upper surface of the swing arm at a position close to the front of the vehicle body.

3. The motor driven vehicle according to claim 1, wherein the duct is connected on the other end side to a vehicle body side connecting portion disposed on the motor driven vehicle.

4. The motor driven vehicle according to claim 3,
wherein the motor driven vehicle comprises a scooter-type motor driven two-wheeled vehicle, and wherein the vehicle body side connecting portion comprises a storage box installed below a seat of the motor driven vehicle.

5. The motor driven vehicle according to claim 1, further comprising:
a control unit for the electric motor,
wherein a battery and the control unit are housed in an inside of the swing arm, and wherein the harness is connected to the control unit inside the swing arm.

6. The motor driven vehicle according to claim 5,
wherein the swing arm includes a main body case comprising a wide case portion housing the battery, and a cantilever arm portion supporting the drive wheel, and wherein the control unit is disposed to overlap the wide case portion and the cantilever arm portion as viewed from the side of the vehicle body, and disposed close to a vehicle-body front side of the electric motor.

7. The motor driven vehicle according to claim 1, further comprising:
a guide engaged with a guide groove formed on the battery, said guide being disposed on a wall surface between housing spaces defined by a main body case housing the battery so as to extend along an insertion direction of the battery.

8. The motor driven vehicle according to claim 1,
wherein a main body case housing the battery is configured to receive the battery inserted thereinto from any one of a left and right in a vehicle-width direction, and is configured to be divided into at least two parts in the vehicle-width direction.

9. The motor driven vehicle according to claim 1, wherein the pipe-like duct comprises an air duct.

10. The motor driven vehicle according to claim 1, wherein the pipe-like duct comprises a cooling duct.

11. A motor driven vehicle, comprising:
swing arm means swingably mounted to a vehicle body of the motor driven vehicle, for housing an electric motor driving a drive wheel of the motor driven vehicle;
duct means for enabling air to move into an inside of the swing arm means, said duct means having one end side connected to a hole communicating with an inside space of the swing arm means, and another end side extending toward a vehicle body side;
harness means for making electrical connections to the electric motor, said harness means passing through the duct means; and
energy storage means configured to supply electric power to the electric motor, said energy storage means being housed in the swing arm means,
wherein the harness means includes a line connected to an external power source to charge at least the energy storage means.

12. The motor driven vehicle according to claim 11, wherein the electric motor is disposed in the swing arm means at a position close to a rear of the vehicle body, wherein the swing arm means is swingably mounted to the vehicle body by swing shaft means provided on the swing arm means at a position close to a front of the vehicle body, and wherein the duct means is attached on the one end side to an upper surface of the swing arm means at a position close to the front of the vehicle body.

13. The motor driven vehicle according to claim 11, wherein the duct means is connected on the other end side to a vehicle body side connecting portion disposed on the motor driven vehicle.

14. The motor driven vehicle according to claim 13, wherein the motor driven vehicle comprises a scooter-type motor driven two-wheeled vehicle, and wherein the vehicle body side connecting portion comprises storage box means for storage disposed below a seat of the motor driven vehicle.

15. The motor driven vehicle according to claim 11, further comprising control means for controlling the electric motor, wherein an energy storage means and the control means are housed in an inside of the swing arm means, and wherein the harness means is connected to the control means inside the swing arm means.

16. The motor driven vehicle according to claim 15, wherein the swing arm means includes a main body case comprising a wide case portion housing the energy storage means, and a cantilever arm portion supporting the drive wheel, and wherein the control means is disposed to overlap the wide case portion and the cantilever arm portion as viewed from the side of the vehicle body, and disposed close to a vehicle-body front side of the electric motor.

17. The motor driven vehicle according to claim 11, further comprising guide means engaging with a guide groove formed on the energy storage means, said guide means being disposed on a wall surface between housing spaces defined by a main body case housing the energy storage means, so as to extend along an insertion direction of the energy storage means.

18. The motor driven vehicle according to claim 11, wherein a main body case housing the energy storage means is configured to receive the energy storage means inserted thereinto from any one of a left and right in a vehicle-width direction, and is configured to be divided into at least two parts in the vehicle-width direction.

19. The motor driven vehicle according to claim 11, wherein the duct means comprises an air duct means.

20. The motor driven vehicle according to claim 11, wherein the duct means comprises a cooling duct means.

* * * * *